United States Patent [19]

Desalve

[11] 4,233,821
[45] Nov. 18, 1980

[54] ROTOR SUPPORT

[75] Inventor: Dennis W. Desalve, Findlay, Ohio

[73] Assignee: United Aircraft Products, Inc., Dayton, Ohio

[21] Appl. No.: 16,113

[22] Filed: Feb. 28, 1979

[51] Int. Cl.³ .............................................. F16D 3/84
[52] U.S. Cl. .................................... 64/32 R; 417/407
[58] Field of Search ...................... 64/1 V, 3, 4, 32 R; 417/407, 408, 409

[56] References Cited

U.S. PATENT DOCUMENTS

| 2,703,674 | 3/1955 | Woop | 417/407 X |
| 3,936,241 | 2/1976 | Einbeck | 417/407 |
| 3,945,762 | 3/1976 | Leicht | 417/407 |
| 4,004,436 | 1/1977 | Mott | 64/32 R |

Primary Examiner—Christopher K. Moore
Attorney, Agent, or Firm—J. E. Beringer

[57] ABSTRACT

A rotor support in turbo and like machinery. A rotor has bearing support in a tubular cartridge member. In a cantilever construction, the cartridge member is fixed at one end to a first housing wall and extends perpendicularly therefrom to a non-rigid mounting in another housing wall in a longitudinal spaced relation to the first. Installed as an interface member between the opposite or outer end of the cartridge member and the second housing wall is a resilient metallic C-ring. The C-ring achieves substantially constant support characteristics throughout wide ranging and repeated thermal expansions and contractions of contacting parts, and over a relatively long period of time.

5 Claims, 4 Drawing Figures

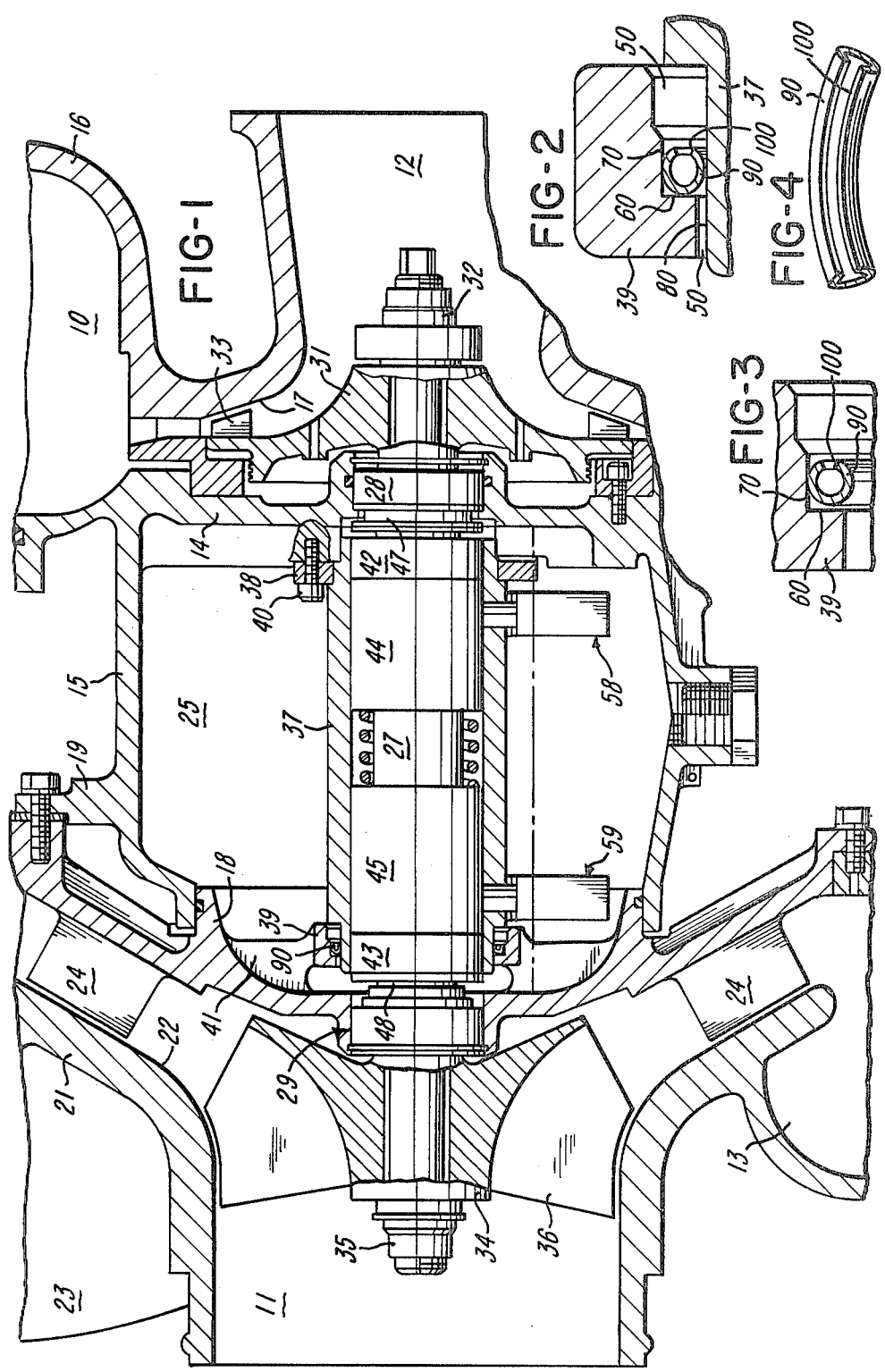

ROTOR SUPPORT

BACKGROUND OF THE INVENTION

This invention relates to rotor supports in turbo and like machinery, for example air cycle machines. In machines of this general class, a rotor is subjected to dynamic influences and to temperature variations which can create problems in the reliability of its operation and in uniformity of response over long working periods. The rotor is mounted in a bearing cartridge. The establishment of a proper support for the bearing cartridge has been a subject of design experimentation looking toward a maximum damping or absorption of dynamic influences. It has been endeavored to achieve a close machined fit of the cartridge member in its supporting housing but this is impractical in dealing with machine produced parts and mass assembly. Also, a differential response to changing temperature can induce undesirable stresses. It has been suggested to mount the cartridge in a housing with elastomeric interface members, but these offer support characteristics changing with time and temperature, and, moreover, limit environmental conditions in which a rotor assembly can operate.

SUMMARY OF THE INVENTION

The instant invention offers a generally new cartridge mounting in a rotor assembly. In a cantilever type installation, a cylindrical cartridge is fixed at what may be regarded as an inner end to a stationary housing wall and projects perpendicularly therefrom toward another housing wall, a rotor projecting through the housing walls and through the intermediately positioning cartridge. Longitudinally spaced apart bearings in the cartridge support the rotor for relative rotary motion. At what may be regarded as an outer end thereof, the cartridge is in a telescoping relation with a surrounding collar forming a part of the stationary housing structure. Parallel surfaces on the cartridge and the collar are in an adjacent, spaced relation which simplifies assembly and allows for thermally induced expansion and contraction of the parts. An interface member in the form of a metallic C-ring is interposed between the parallel surfaces of the collar and cartridge, and parts are so dimensioned that upon installation the C-ring is subjected to a predetermined compression or deflection. Dynamic influences at work upon the rotor are transmitted through the bearing to the cartridge and through the C-ring to the housing structure. Vibratory and like effects tend to be absorbed within the C-ring which attempts to maintain the cartridge concentrically of the collar. Moreover, relative expansion and contraction of the cartridge and housing collar are accommodated in the C-ring and the yield and springback characteristics of the C-ring are relatively unaffected either by temperature or by time of operation.

An object of the invention is to provide a rotor support, useful in turbo and like machinery, substantially as in the foregoing.

Other objects and structural details of the invention will appear more clearly from the following description, when read in connection with the accompanying drawings, wherein:

FIG. 1 is a detail fragmentary view in longitudinal section of the rotor assembly of an air cycle machine, showing a rotor support in accordance with the illustrated embodiment of the invention;

FIG. 2 is a fragmentary enlarged view of a portion of FIG. 1;

FIG. 3 is a view like FIG. 2, the cartridge member being removed; and

FIG. 4 is a detail view of a metallic C-ring useful in practice of the invention.

Referring to the drawings, the invention has particular though not limited reference to air cycle machines, and, for convenience of disclosure is shown as embodied in such a machine. It will be understood, however, that support concepts of the invention are widely applicable to machines using high speed rotors.

As seen in FIG. 1, a rotor assembly of an air cycle machine provides, at opposite ends thereof, an annular inlet 10 for a compressed air or gas and an inlet 11 for a lower pressure, lower temperature air or gas, for example air drawn from ambient surroundings. The inlets 10 and 11 are part of a segmented housing structure which further forms an outlet 12 generally concentric with annular inlet 10, and a volute chamber 13 in generally surrounding relation to inlet 11. An understanding of details of construction of the segmented housing is not important to an understanding of the present invention. Housing details will accordingly be only briefly considered.

Forming the housing, a vertical wall 14 projects a generally cylindrical skirt 15 therefrom. Bolted to the wall 14 and projecting in a sense oppositely of skirt 15, is a configured element 16 which forms the inlet 10 and outlet 12, along with a generally radial passage 17 leading from the annular inlet to the outlet.

At its outer end skirt 15 receives a flanged portion of a diffuser plate 18. A peripheral portion of plate 18 extends radially beyond skirt 15 and is bolted to a flange 19 thereon. Also bolted to a peripheral portion of plate 18 is a configured segmental housing portion 21 which forms inlet 11, volute chamber 13, and an intercommunicating passage 22. The segmental housing portion 21 includes also an outlet 23 from the volute chamber 13. The plate 18 has diffuser blades 24 positioned in passage 22. The diffuser plate 18 effectively closes the outer end of skirt 15 and defines with the skirt and with vertical wall 14 an interior chamber 25 providing an oil reservoir. A rotor shaft 27 intersects the chamber 25, and, at its opposite ends projects through shaft seals 28 and 29 positioned in coaxial openings in the wall 14 and in diffuser plate 18 respectively. A turbine wheel 31 is keyed to that end of shaft 27 projecting through and beyond seal 28. It is held in a position on the shaft by means including a nut 32. The turbine wheel 31 has blades 33 positioning in flow passage 17. In somewhat similar manner, that end of shaft 27 which projects through and beyond seal 29 has a blower wheel 34 keyed thereto, held in place on the shaft by means including a nut 35. Blower wheel 34 has blades 36 positioning in passage 22. Operational and functional concepts of an air cycle machine are well known. Briefly, an air or gas under pressure admitted to the rotor assembly at inlet 10 expands through passage 17 into outlet 12. A nozzle means 30 assists in directing and accelerating flow. In the process, a large part of its energy is consumed in acting upon blades 33 to initiate a relatively high speed rotary motion of turbine wheel 31 and of the shaft 27 to which it is attached. With its heat energy largely dissipated, the now relatively cool air discharges generally axially from outlet 12 to a place of use. The rotary motion of shaft 27 causes blower wheel 34 to rotate. This motion of the blower wheel draws air from ambient surroundings into the rotor assembly by way of inlet 11 and directs it under conditions of increasing pressure and temperature into volute 13 for ultimate discharge by way of outlet 23. Diffusers 24 assist in obtaining a directed, controlled flow of air into the volute portion.

A cylindrical member 37, which for convenience of description is termed a cartridge, is in a surrounding, supporting relation to the rotor shaft 27 in chamber 25. At what may be regarded as an inner end thereof, the cartridge 37 has an external flange 38 fixed thereto by which the cartridge is bolted, using bolts 40, t to a raised portion of housing wall 14. From the housing wall 14, the cartridge 37 extends freely outwardly into chamber 25 in cantilever fashion. What may be regarded as an opposite or outer end of the cartridge is reduced in diameter and positioned centrally of a hub 39 formed integrally with spider means 41 projecting from the diffuser plate 18. The spider means and its hub 39 accordingly is fixed relative to the cartridge 37, or, more particularly, to the outer free end of the cartridge. As indicated in FIG. 2, the reduced diameter outer end of the cartridge 37 is separated from the hub 39 by a gap 50 so that the mounting of the cartridge is one of true cantilever form, the cartridge being fixed at only one end, namely that end bolted to housing wall 14.

An outer face of the hub 39 is formed with a taper configuration 50 leading into an axial recess 60. The arrangement defines a circular longitudinal surface 70 in parallel spaced relation to an external surface 80 on the reduced diameter outer end of cartridge 37. A hollow, metallic ring 90, C-shaped in cross section is installed in the recess 60 to have opposite portions thereof in respective contacting relation to surfaces 70 and 80. The ring 90 is made of a deformable sheet metal, bent arcuately upon itself to form a generally circular outline which at opposite ends of the sheet material includes a gap 100. The C-ring is relatively stiff and tends to hold the cartridge member in a concentric relation to the hub 39, substantially as shown. It is capable of yielding, however, to radially applied pressures and has appreciable spring back characteristics whereby it tends to restore itself to a normal configuration. Accordingly, in the event cartridge member 37 expands under the generated heat of operation, such expansion is accommodated in a compression or deflection of the ring 90. When temperatures cool from attained high values, the cartridge member and hub 39 contract toward a normal dimension resulting in a relative separating motion of surfaces 70 and 80. The C-ring 90, because of its spring back characteristics, is enabled to follow the separating surfaces and so maintains its yielding support of the cartridge member. Under all expected operating conditions, therefore, the C-ring 90 provides a yielding support of the cartridge member and of the rotor 27 installed therein.

The cantilever mounting of the cartridge member, in conjunction with the C-ring support at an outer end thereof, provides for an improved support by maintaining a more constant response characteristic over a wide variation of operating temperatures. The C-ring support at the outer end maintains continuous contact between the cantilevered cartridge member and the hub 39, as well as maintains a substantially constant static stiffness of the support while incorporating adequate yield therein to absorb dynamic rotor influences at any expected temperature. The C-ring is dimensioned so that an initial assembly of the parts whereby the hub 39 with installed C-ring is brought into a telescoping relation to the cartridge 37 achieves an initial deflection or compression of the C-ring. Being so installed with a controlled deflection, the C-ring is fully capable of responding to and following relative separating and approaching movements of the hub 39 and cartridge member during operation of the rotor assembly. Since thermal expansions are compensated for, a more constant dynamic support characteristic is achieved, providing a more constant machine operating characteristic resulting in improved machine service life and performance. The metallic C-ring forms an interface member which since it is relatively unaffected by temperature and by time of use has substantially uniform characteristics over a relatively long period of use and under a variety of temperature conditions.

The cartridge member 37 has the rotor 27 installed therein through mounting bearings 42 and 43 and interior sleeves 44 and 45 all providing for a transmission of dynamic influences from the rotor radially outwardly to the cartridge member. The sleeves 44 and 45 are urged by an intermediately positioning spring 46 outwardly against respective bearings 42 and 43. Interposed between the bearing 42 and the seal 48 is a centrifugal pumping device 47 and similarly positioned between bearing 43 and seal 29 is a centrifugal pumping device 48. The devices 47 and 48 serve a purpose, which it is unnecessary to consider here in detail in encouraging a movement of oil through the bearings back into the interior reservoir chamber 25. The centrifugal devices 47 and 48 are part of an oiling system which further includes capillary devices 58 and 59 projecting beneath the cartridge member 37 into a body of oil contained in chamber 25. The devices 58 and 59 are fixed to and project radially through the cartridge member 37, being accommodated in radial openings therein. In a manner in which it is unnecessary hereto consider, the devices submerged in the oil in chamber 25 conduct oil responsively to rotation of the rotor 27 to the rotor surface and to and through the bearings 42 and 43, effecting cooling and lubricating functions in connection with the bearings.

The C-ring 90 may be regarded as having a toroidal shape. That part of its circumference which includes the gap 100 faces out of recess 60 toward housing wall 14. Inner and outer diametral portions become bearing surfaces maintaining a continuous and pressured contact with cartridge and hub surfaces 80 and 70. The bearings 42 and 43 are rolling bearings. Bearing 43, it will be noted, locates approximately in a common plane with hub 39. Dynamic influences of the rotor accordingly are directly transmitted through the bearing to and through C-ring 90 to the housing, with such influences being to a substantial extent absorbed within the C-ring.

While one physical form the invention may take has been illustrated and described, it will be understood that modifications of the invention are possible within the intent and scope of concepts expressed.

In the claims:

1. In a rotor assembly, a housing structure providing spaced apart walls, a rotor extending transversely of said walls, means providing bearing support for said rotor including a cartridge member in surrounding relation to said rotor and fixed at one end to one of said housing walls, said cartridge member extending toward another of said walls, said other wall having fixed thereto a collar receiving an opposite end of said cartridge in a telescoping relation, a resilient metallic C-ring installed between said cartridge member and said collar to be under an initial compression in the assembly of said cartridge member to said collar, and said means providing bearing support for said rotor including bearing means within said cartridge transmitting dynamic influences of said rotor to said cartridge member and through said cartridge member and said C-ring to said housing.

2. A rotor assembly according to claim 1, said collar having a recess facing said one housing wall, said recess receiving said C-ring and providing a circular surface in parallel spaced relation to an exterior surface on said cartridge member between which surfaces said C-ring is compressed.

3. A rotor assembly according to claim 2, said collar being fixed to said other wall in a relative projecting relation and being formed with first and second interior diameters, the first diameter being in an adjacent spaced relation to the exterior of said cartridge member and the second diameter being larger than the first and forming said recess and said circular surface.

4. A rotor assembly according to claim 3, a portion of the said opposite end of said cartridge member being reduced in diameter where it is contacted by said C-ring and said bearing means including a rolling bearing unit interiorly of the reduced diameter portion of said cartridge member and locating in a plane approximately coincident with said collar.

5. A rotor assembly according to claim 4, said C-ring having a toroidal configuration in which a gap inherently formed therein faces in a direction longitudinally of said recess, inside and outside diameters of said ring forming bearing surfaces to contact the exterior surface on said cartridge member and the circular surface on said collar respectively, said ring in an uncompressed condition thereof providing a distance between said bearing surfaces exceeding the distance between said circular surface and the exterior surface on said cartridge member.

* * * * *